United States Patent [19]

Waddington

[11] Patent Number: 4,699,021

[45] Date of Patent: Oct. 13, 1987

[54] INTEGRATED POWER SYSTEM

[75] Inventor: Clive Waddington, Stratford, Conn.

[73] Assignee: Avco Corporation, Greenwich, Conn.

[21] Appl. No.: 652,508

[22] Filed: Sep. 20, 1984

[51] Int. Cl.⁴ .................... F16H 47/04; B62D 11/00
[52] U.S. Cl. ...................................... 74/687; 74/677; 180/6.44
[58] Field of Search ................ 74/677, 681, 682, 687; 180/6.44; 60/711, 39.163

[56] References Cited

U.S. PATENT DOCUMENTS

| | | | |
|---|---|---|---|
| 2,930,257 | 3/1960 | Christenson | 74/681 X |
| 3,280,554 | 10/1966 | Knowles | 74/675 X |
| 3,286,543 | 11/1966 | Porter | 74/687 X |
| 3,477,225 | 11/1969 | Cryder et al. | 74/862 |
| 3,498,057 | 3/1970 | Kronogard et al. | 74/665 L X |
| 3,546,879 | 12/1970 | Hass | 60/39.163 |
| 3,626,692 | 12/1971 | Kumm | 60/39.163 |
| 3,938,604 | 2/1976 | Kugler et al. | 180/6.44 |
| 3,958,655 | 5/1976 | Kronogard | 74/687 X |
| 3,979,915 | 9/1976 | Krongard | 60/39.163 X |
| 4,051,679 | 10/1977 | Collin | 60/39.163 X |
| 4,174,762 | 11/1979 | Hopkins et al. | 180/6.44 |
| 4,184,387 | 1/1980 | Kiritani et al. | 74/720.5 |
| 4,428,445 | 1/1984 | Zaunberger | 180/6.44 |
| 4,433,547 | 2/1984 | Firey | 60/711 |
| 4,464,973 | 8/1984 | Rodler | 180/6.44 |
| 4,519,275 | 5/1985 | Maruyama et al. | 74/687 X |

FOREIGN PATENT DOCUMENTS

| | | | |
|---|---|---|---|
| 2055380 | 5/1972 | Fed. Rep. of Germany | 180/6.44 |
| 2450189 | 10/1980 | France | 180/6.44 |
| 2042441 | 9/1980 | United Kingdom | 180/6.44 |

*Primary Examiner*—Leslie Braun
*Assistant Examiner*—Joseph M. Rolnicki
*Attorney, Agent, or Firm*—Perman & Green

[57] ABSTRACT

An integrated power system for use with a gas turbine engine is provided for driving and steering a tracked vehicle under the control of the vehicle's operator. The system includes a multispeed transmission for transmitting power from a free power turbine, included in the gas turbine engine, to combining planetary gear systems driving the vehicle, elements of the combining planetary gear systems also being driven by a variable displacement hydraulic steering motor. The transmission is connected to a direct displacement pump for supplying fluid under pressure to the steering motor and to an accumulator which stores and releases energy to the pump to reduce shock to the system as the speed ratio of the transmission is changed in response to the speed of the free power turbine. A control system, responsive to the vehicle's operator, determines operation of the hydraulic steering motor to effect steering as well as controlling the power output of the gas turbine engine. The control system, in response to the vehicle's operator, also controls pivot steering as well as movement of the vehicle in forward or reverse directions. An overrunning clutch interconnects the free power turbine to the gas producer whenever the turbine tries to exceed the speed of the gas producer.

8 Claims, 3 Drawing Figures

INTEGRATED POWER SYSTEM

BACKGROUND OF THE INVENTION

Existing transmissions used in tracked vehicles, such as army tanks, are designed basically for use with diesel engines. They are low speed devices typically employing hydraulic torque converters to provide the required starting characteristics and damping during mechanical gear shifting. When used as a power system in conjunction with a gas turbine engine, they do not take advantage of the torque and variable speed characteristics of the free power turbine usually present in such engines nor are they compatible with the high speed output of such free power turbines. As a result, prior art devices, in addition to being needlessly large and heavy, are not suitable for use in vehicles driven by gas turbine engines. The present invention provides an integrated power system not only capable of taking full advantage of the operating characteristics of an associated gas turbine engine but also of controlling vehicle operation with minimum intervention by its operator.

SUMMARY OF THE INVENTION

The preferred embodiment of the present invention is described in association with a gas turbine engine having a gas producer and a free power turbine. It comprises a multispeed geared transmission driven by the free power turbine and means for transmitting power from the transmission to the driving elements, such as drive sprockets, of a tracked vehicle. An overrunning clutch is also provided to interconnect the free running turbine and the gas producer section of the gas turbine engine whenever the turbine speed tries to exceed that of the gas producer, thereby preventing overspeeding of the turbine, providing dynamic braking and permitting tow starts of the vehicle should that prove necessary.

A control system is connected with the gas turbine engine as well as the transmission for controlling the power output of the engine, the speed ratio of the transmission, and the direction in which the vehicle is to be driven. The control system includes a variable displacement hydraulic motor for steering the vehicle under the control of its driver. Also included is a fixed displacement hydraulic pump/motor and an accumulator for storing energy derived from, and delivering it to the free power turbine as needed to reduce shock associated with changes of transmission speed ratio and to help drive the variable displacement hydraulic motor to effect steering. the control system is automatic in operation as it responds to driver positioning of the throttle and steering wheel and his selection of the direction in which he wishes the vehicle to move.

The foregoing elements of the invention allow for a 30% reduction in the size of the transmission compared to prior art devices while improving the performance of the vehicle.

Although the preferred embodiment of the invention is described with particular reference to a tracked vehicle, such s an army tank, it should be understood that it is applicable to any system having output elements to be driven at variable speed and in different directions under operator control.

DESCRIPTION OF THE DRAWINGS

The invention is described in more detail below with particular reference to the attached drawings in which.

OVERVIEW OF THE INTEGRATED POWER SYSTEM

Figure 1:
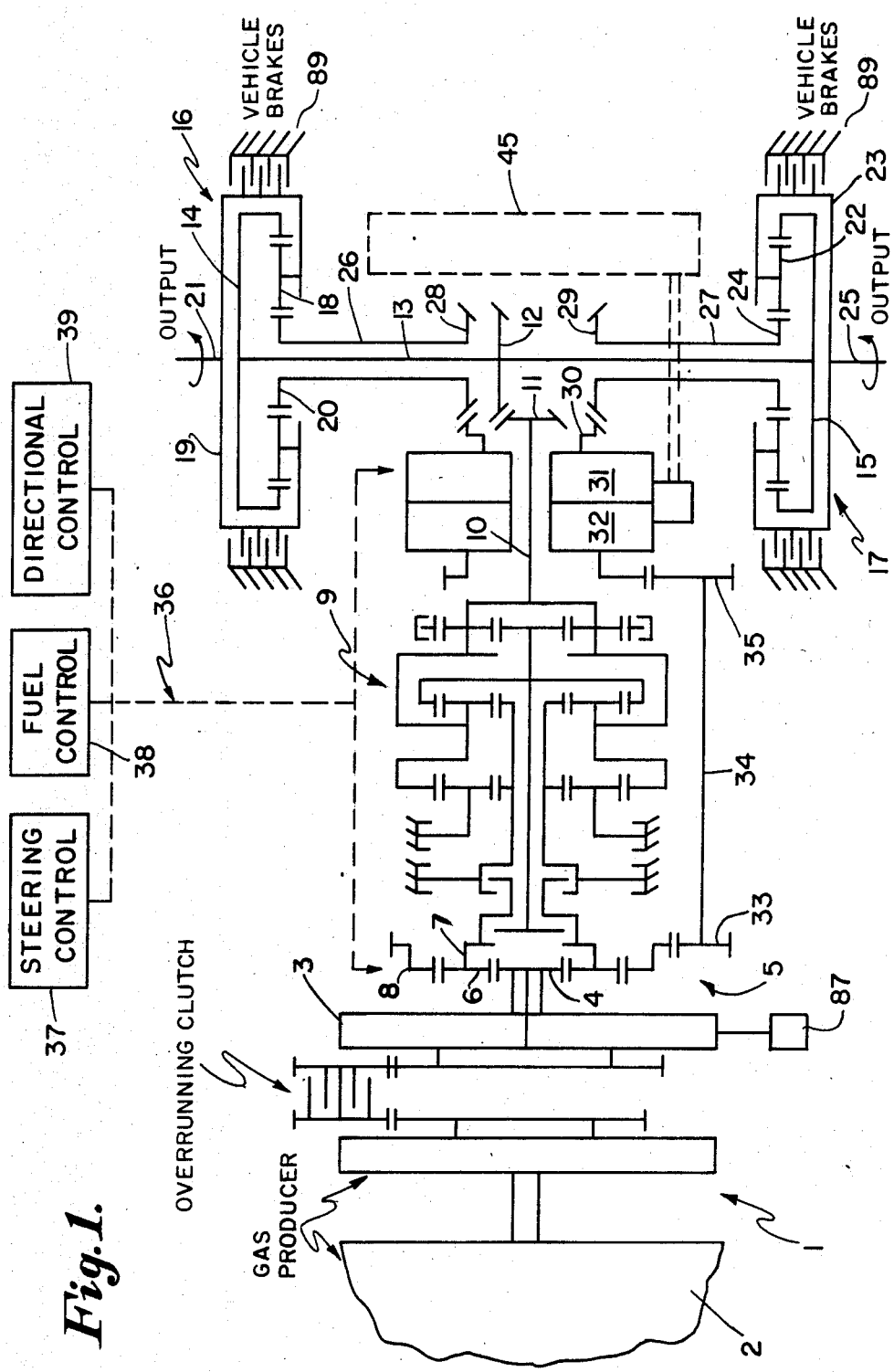
FIG. 1 is a simplified schematic of the integrated power system.

Referring first to FIG. 1, there is shown a gas turbine engine, generally designated 1, including a gas producer 2 and a free power turbine 3. The free power turbine is connected to a sun gear 4 comprising one element of a planetary gear system, generally designated 5. Other elements of the planetary gear system include planet gears 6 engaging sun gear 4 and ring gear 8, the planet gears being rotatably mounted on planet carrier 7. As will be more fully described later in the specification, planet carrier 7 may be coupled by clutches to other elements of a multispeed transmission, generally designated 9.

Transmission 9 drives output shaft 10 which is connected to bevel gear 11 engaging bevel gear 12 secured to drive shaft 13. The drive shaft is connected to ring gears 14 and 15 comprising elements of combining planetary gear systems, generally designated 16 and 17, respectively. Combining planetary gear system 16 includes planet gears 18 rotatably mounted on planet carrier 19, the planet gears engaging sun gear 20 and ring gear 14. An output shaft 21 is secured to planet carrier 19 for transmitting power to a driven element, such as a drive sprocket (not shown), of a tracked vehicle. Comparable elements are included in combining planetary gear system 17. It includes planet gears 22 rotatably mounted on planet carrier 23, the planet gears engaging sun gear 24 and ring gear 15. Planet carrier 23 is connected to an output shaft 25 driving another sprocket on the opposite side of the vehicle.

Sun gears 20 and 24 are connected to steering shafts 26 and 27, respectively. Steering shaft 26 is connected to a bevel gear 28, and steering shaft 27 is connected to bevel gear 29, both bevel gears 28 and 29 engaging a bevel gear 30 actuated by a variable displacement hydraulic motor 31. Fluid under pressure is supplied to hydraulic motor 31 by a direct displacement hydraulic pump 32 driven by pinion 33, lay shaft 34 and pinion 35, pinion 33 being engaged with ring gear 8 of planetary gear system 5.

As will be described more fully with reference to the control system, generally designated 36, steering shafts 26 and 27 may be rotated in opposite directions by hydraulic motor 31 to steer the vehicle. The hydraulic motor may also be held stationary when steering is not required and the vehicle is to be driven on a straight course. The output to the vehicle's sprockets is a function of the combined input of drive shaft 13 and the steering shafts which together determine the operation of the combining planetary gear systems 16 and 17.

The operator of the vehicle can manipulate a steering control 37, a fuel control 38, and a directional control 39, being integral parts of control system 36. At his option, the operator may increse power transmitted to the vehicle by use of the fuel control, typically a foot operated throttle. He may also elect to make the vehicle remain motionless or move in the direction desired by use of the directional control. Steering, both while the vehicle is in motion or at rest (known as "pivot steering"), can be effected by the steering control in combinatio with the directional control.

DESCRIPTION OF THE CONTROL SYSTEM

Figure 2:
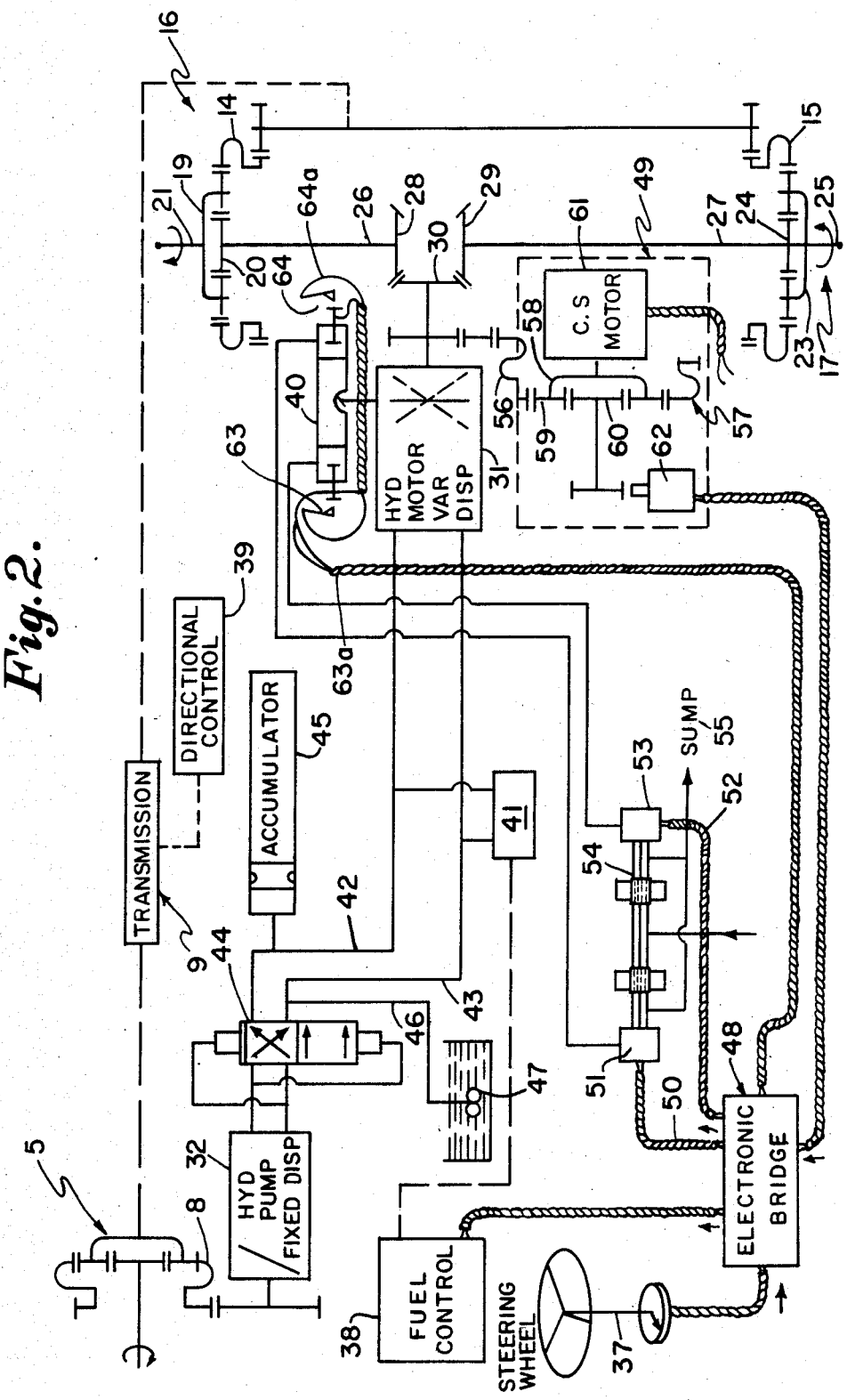
FIG. 2 is a schematic showing the elements of the system for controlling the output of the integrated power system and movement of an associated vehicle.

Attention is now directed to FIG. 2 and more particularly to the variable displacement hydraulic motor 31 which drives bevel gear 30 and, through bevel gears 28 and 29, steering shafts 26 and 27, respectively. The rotational forces applied to the steering shafts are a function of the position of the hydraulic motor and the pressure of the fluid supplied to it. The hydraulic motor is a conventional rotary type which, when in its central position, is in effect stalled, holding bevel gear 30 immobile. Under such conditions, the vehicle is not influenced to steer in any direction but a straight course. However, as the hydraulic motor is rotated clockwise, it generates a torque rotating bevel gear 30 in one direction, the amount of torque generated being determined by the amount of rotary displacement of the hydraulic motor and the pressure of the fluid supplied to it. When the hydraulic motor is rotated counterclockwise, torque is generated to drive bevel gear 30 in the opposite direction. Once again, the amount of torque generated is determined by the amount of rotary displacement of the hydraulic motor and the pressure of the fluid supplied to it.

As will be explained more fully below, the displacement of the hydraulic motor, either clockwise or counterclockwise, is determined by an actuator 40, and the pressure of the fluid acting upon the motor is determined by the fixed displacement pump 32 and an associated pressure relief valve 41 the setting of which is modulated by the setting of the fuel control 38. High pressure fluid is supplied to hydraulic motor 31 through line 42, and low pressure fluid is vented from it through line 43. Both the high and low pressure lines are connected to a conventional shuttle valve 44 interconnected between the lines to assure that high pressure fluid is always supplied to line 42 and low pressure fluid to line 43 regardless of the direction of rotation of the pump 32. The shuttle valve is included in the system because, under some operational conditions, the direction in which the pump 32 rotates may reverse, yet the pressure relationship in associated lines 42 and 43 must remain unchanged.

Relief valve 41 is connected to fuel control 38 and modulated by the fuel control to hold the pressure in line 42 at a value proportional to the desired output torque of the free gas turbine 3 at the setting of the fuel control selected by the operator of the vehicle. An accumulator 45 is connected to high pressure line 42 to maintain the pressure at the appropriate value in the event that the output of the pump 32 is insufficient during brief transitional periods when the speed ratio of transmission 9 is being shifted, as will be explained.

Fluid under low pressure is supplied through line 46 to the system from an auxiliary pump 47 which may be directly driven by the gas producer section of the gas turbine engine.

The position of actuator 40 is determined by the steering control 37, shown and described as a steering wheel for illustrative purposes. The position of the steering wheel controls one element of an electronic bridge, generally designated 48. Another element of the bridge is controlled by a sensor, generally designated 49, which provides an output signal to the bridge proportional to the speed and direction of rotation of the hydraulic motor 31. When the output signal from the sensor is commensurate with the signal from the steering wheel, the bridge is balanced and the actuator 40 rotates the hydraulic motor to a stalled condition ending the steering operation.

An unbalanced condition in bridge 48 produces output signals effecting steering operations. If the vehicle is to be steered in one direction, as determined by the position of the steering wheel 37, a signal flows via wires 50 to a solenoid 51. If the vehicle is to be steered in the opposite direction, a signal is sent via wires 52 to another solenoid 53. The energization of these solenoids determines the position of a spool valve 54. If solenoid 51 is energized, oil from auxiliary pump 47 flows through the spool vlve to one end of actuator 40; if solenoid 53 is energized, oil from the auxiliary pump flows to the opposite end of actuator 40. As one end of the actuator receives fluid under pressure, the opposite end is vented to sump 55 via spool valve 54. As noted above, movement of the actuator rotates the hydraulic motor 31 thereby generating a torque to steer the vehicle.

As the hydraulic motor gains speed, it drives ring gear 56 of a planetary gear system, generally designated 57, comprising one element of sensor 49. Planet carrier 58 rotatably supports planets 59 which engage the ring gear 46 and a sun gear 60. The output speed of the sun gear 60 is a function of the rotational speed and direction of ring gear 56 and the output of a constant speed motor 61 driving planet carrier 58. The sun gear is connected to an electrical generator 62 which may take the form of a pulse counter and signal conditioner. The output voltage of the generator is indicative of the steering being effected by hydraulic motor 31, that voltage being supplied to bridge 48. As the voltage gradually balances the bridge, spool valve 54 is deenergized and the hydraulic motor brought to a central, stalled condition.

In the event that the hydraulic motor cannot be brought up to a speed appropriate for the steering movement selected by the vehicle's operator, actuator 40 will move to an extreme position. Such extreme movement in either direction will close switch 63 or 64, thereby sending a signal via wires 63a and 64a, respectively, to fuel control 38 which increases the fuel flow, and hence the power output, of the gas turbine engine. such an increase of power increases the pressure setting of relief valve 41 and increases the pressure of the fluid supplied to the variable displacement hydraulic motor 31. This increases the torque available for steering which can then be ccomplished as demanded by the operator of the vehicle.

It should be noted that all steering operations described above can be accomplished whether the vehicle is in motion or at rest. In other words, a moving vehicle can be steered along a curved course while moving or can be made to turn on a vertical axis (pivot steering). As will be described more fully below, pivot steering is accomplished by placing directional control 39 in the pivot steer position and then increasing the flow of fuel to the gas turbine engine by actuating fuel control 38.

DESCRIPTION OF TRANSMISSION

Figure 3:
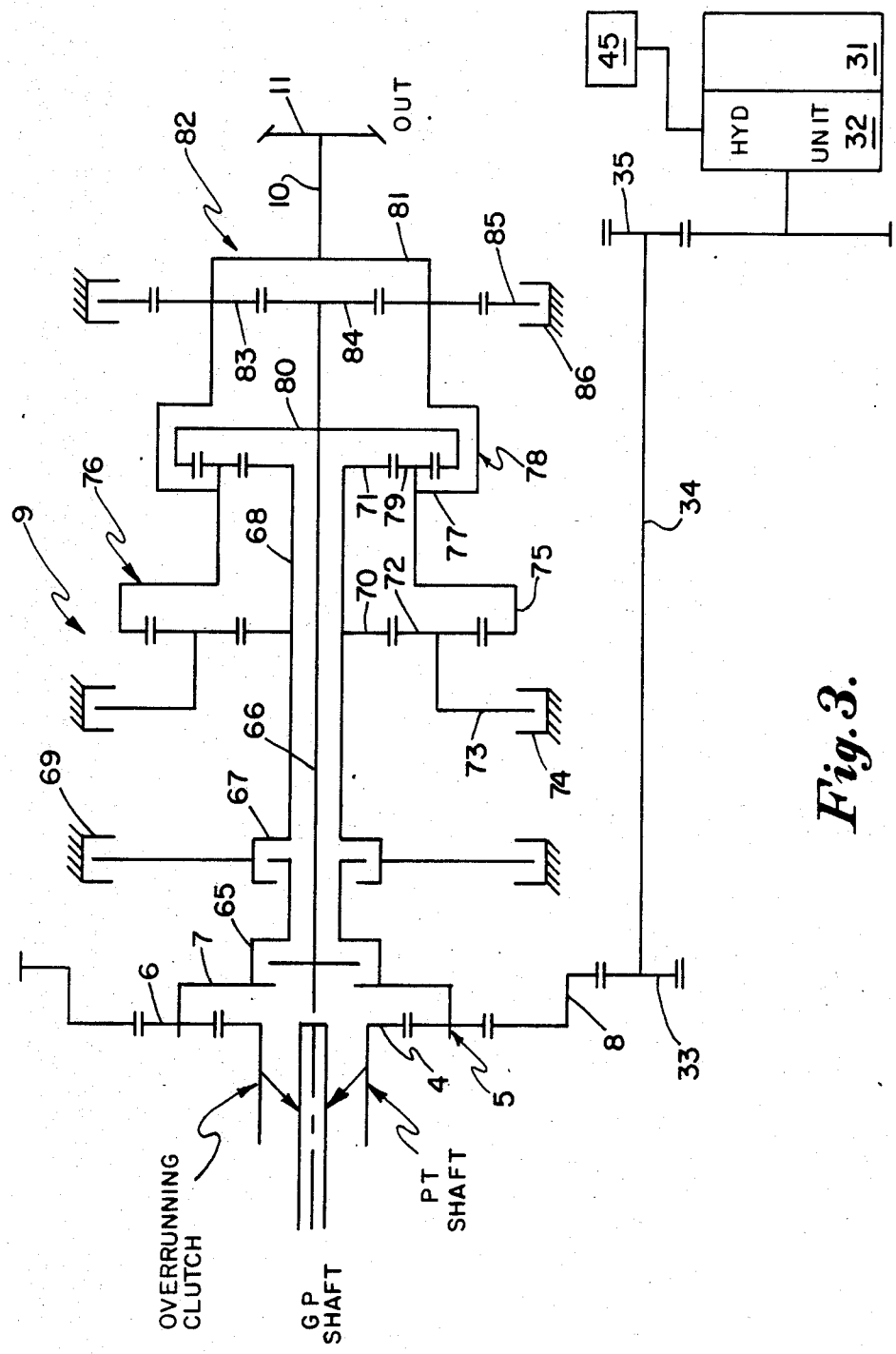
FIG. 3 is a schematic of the transmission comprising a portion of the integrated power system.

As shown in FIG. 3, the transmission, generally designated 9, comprises a series of gear trains including the planetary gear system, generally designated 5 in FIGS. 1 and 2. As noted above, free power turbine 3 drives sun gear 4 of the planetary gear system 5. Its planetary carrier 7 may be coupled by clutch 65 to shaft 66 or by clutch 67 to intermediate shaft 68 surrounding shaft 66. Secured to shaft 68 is disk brake 69 and sun gears 70 and 71. Sun gear 70 engages planet gears 72 rotatably supported by planet carrier 73, the planet carrier 73 being connected to disk brake 74. Planet gears 72 also engage ring gear 75, the ring gear 75 and associated planet gears 72 and sun gear 70 comprising a planetary gear system, generally designated 76.

Secured to ring gear 75 is a planet carrier 77, being one element of a planetary gear system, generally designated 78. Other elements of the latter planetary gear system include planet gears 79 rotatably supported by planet carrier 77, the planet gears engaging sun gear 71 and ring gear 80 secured to shaft 66. Planet carrier 77 is secured to planet carrier 81 of a planetary gear system, generally designated 82, and to output shaft 10. Planetary gear system 82 comprises planet gears 83 rotatably supported by planet carrier 81, the planet gears being engaged with sun gear 84, secured to shaft 66, and with a ring gear 85. Associated with ring gear 85 is a disk brake 86.

As will be described, various combinations of the clutches and brakes may be engaged to change the speed ratio of the transmission to provide four speeds forward and two in reverse. Engagement of the clutches and brakes is accomplished by electrical signals sent by a speed responsive control 87 driven by the free power turbine 3. As the speed of the free power turbine increases in response to the setting of the fuel control 38 (see FIG. 1), the speed ratio of the transmission is automatically changed, thereby reducing the ratio, either in forward or in reverse, as the vehicle is brought up to speed. Conversely, as the vehicle slows down as when ascending a grade, the speed ratio is gradually increased to maintain the speed of the vehicle.

As long as the engine is idling, variable displacement motor 31 and pump 32 are short-circuited by relief valve 41 and no power will be transmitted through the transmission to its output shaft 10. When the directional control 39 is in neutral, all of the aforedescribed clutches and brakes are disengaged so transmission of power to the output shaft 10 is precluded. Even if the directional control is positioned for movement forward or in reverse or for pivot steering, no power will be transmitted if the engine continues to idle. Under such circumstances, transmission of power can only occur when the fuel control is actuated to increase the flow of fuel to the gas turbine engine thereby simultaneously shifting the position of relief valve 41.

In first speed forward, clutch 65 and brake 86 are engaged, the other clutch and brakes remaining disengaged. As the flow of fuel to the engine is increased, clutch 65 transmits power from planet carrier 7 to shft 66. Since ring gear 85 is held stationary by brake 86, sun gear 84, connected to shaft 66, drives planet gears 83 causing planet carrier 81 to rotate and drive output shaft 10. The amount of torque transmitted through planetary gear system 5 to shaft 66 via clutch 65 is a function of the resistance to rotation imposed on ring gear 8 by hydraulic pump 32. The amount of resistance is determined by the pressure of pump 32 under the control of the relief valve 41.

Accumulator 45, associated with the hydraulic pump, is precharged to approximately 1500 psi. As the speed of the engine increases in response to increased fuel flow, the pressure output of hydraulic pump 32 increases and fluid is fed to accumulator 45. The pressure attained is a function of the setting of relief valve 41 and eventually produces torque sufficient to hold ring gear 8 stationary at a value commensurate with the setting of the fuel control. As will be described more fully below, the pump, in combination with the accumulator, absorbs energy from the ring gear 8 or delivers energy to it to reduce the shock on the gear systems incidental to changes of speed ratio.

In second speed forward, clutch 65 remains engaged, but brake 86 is released and brake 74 is engaged, thereby holding planet carrier 73 stationary. Ring gear 80, secured to shaft 66, then drives planet gears 79 imparting power to sun gears 70 and 71. Sun gear 70 drives ring gear 75, and hence planet carriers 77 and 81 through planet gears 72. Since planet gears 79 also drive the planet carrier 77, the ratios of planetary gear systems 76 and 78 determine the ratio at which power is transmitted at second speed to output shaft 10.

The engagement of the various clutches and brakes is a function of the speed of the free power turbine which, in turn, is determined by operation of the fuel control. The resistance, or reactive torque of ring gear 8, at each speed ratio of the transmission is determined by the setting of relief valve 41 in response to movement of the fuel control, the reactive torque of the ring gear 8 thereby being held at a value commensurate with the setting of the fuel control.

As will not be apparent, other speed ratios, forward and in reverse, may be effected by the engagement of one clutch and brake as listed below while the other clutch and brakes remain disengaged:
Third speed forward: Clutch 65 and brake 69 engaged.
Fourth speed forward: Clutches 65 and 67 engaged.
Low speed reverse: Clutch 67 and brake 86 engaged.
High speed reverse: Clutch 67 and brake 74 engaged.

Typically the ratios of input speed to the output speed of the transmission are as follows:
First speed forward: 4.83
Second speed forward: 1.80
Third speed forward: 1.25
Fourth speed forward: 1.00
Low reverse: 5.04
High reverse: 1.8

The output of shaft 10, transmitted through bevel gear 11, as has been explained, is combined with the output of the steering system by the combining planetary gear systems 16 and 17 so that the vehicle is responsive in its direction of motion and speed to the operator of the vehicle.

DESCRIPTION OF OPERATION

As his first step in operating the vehicle, the operator will start gas turbine engine 1 and permit it to idle. Under such conditions, all clutches and brakes, described with reference to FIG. 3, will be disengaged and relief valve 41 will interconnect lines 42 and 43 so that the fluid pressure in both lines stabilizes at the pressure of the accumulator 45. Pinion 33 provides no torque resisting rotation of ring gear 8 since pump 32 is in effect short-circuited and offers no resistance to the rotation of pinion 35 and lay shaft 34 connected to the pinion 33. In that mode of operation, increase of fuel to the gas turbine engine by actuation of fuel control 38 could cause overspeeding of the free power turbine. To prevent such an occurrence, an overrunning clutch 88 is provided to couple the free power turbine to the gas producer whenever the rotational speed of the free power turbine reaches and tries to exceed that of the gas producer. The inertia and power absorption characteristics of the gas producer are so great that dangerous overspeeding of the free power turbine is prevented. This feature is also effective in all other modes of operation should the overspeed tendency be caused by sudden loss of traction, a missed gearshift, or for another reason.

While the gas turbine engine is idling, the operator may position directional control 39 for forward operation. Doing so immediately engages clutch 65 and brake 86 and places the transmission in first gear forward. Since the setting of relief valve 41, which is positioned by the fuel control, has not been moved, the high and low pressure lines, 42 and 43, respectively, are still short-circuited, and no resistance is offered to the rotation of ring gear 8, and hence no power is transmitted by the transmission to the tracks of the vehicle.

As the operator increases the setting of the fuel control, the position of relief valve 41 is shifted to increase the pressure differential between the high and low pressure lines 42 and 43, respectively. As the pressure rises, hydraulic pump 32 imposes a reaction torque on ring gear 8. Driving torque will be produced at the tracks of the vehicle while, simultaneously, the pressure in accumulator 45 increases. The energy for doing so is derived from and hence decelerates the free power turbine. As the accumulator fills, the hydraulic pump ceases to rotate, deceleration of the free power turbine ceases, and the system operates in first speed forward. Excess energy from the free power turbine, stored in the accumulator during deceleration of the turbine, is fed back to the turbine by the hydraulic pump which then functions as a motor.

When the free power turbine nears rated speed, the speed responsive control 87 simultaneously disengages brake 86 and engages brake 74. This occurs very quickly, typically in less the 0.2 seconds, thereby minimizing heat load on the brakes and hence the size of the brakes needed for satisfactory operation. While the speed ratio of the transmission is being changed from first to second speed, the free power turbine is decelerated at a controlled rate since its torque is limited by the setting of relief valve 41. Rotation of ring gear 8 stores energy from the free power turbine in the accumulator as the turbine is decelerating to its low shift point which takes about 1.0 second. The interchange of energy between the free power turbine and the accumulator eliminates shock to the mechanical elements of the system that is typically present with brakes that engage quickly and systems employing high speed rotors such as the free power turbine. After the shift is completed, the excess energy stored in the accumulator is returned to the free power turbine and hence through the transmission to the tracks of the vehicle, the energy being returned to the system by the hydraulic pump 32 acting as a motor.

As the free power turbine again nears rated speed, brake 74 is disengaged simultaneously with the engagement of brake 69, and the shift to third speed forward is accomplished in the manner described above.

As the free power turbine again nears rated speed, brake 69 is disengaged and clutch 67 simultaneously engaged, thereby accomplishing the shift to the fourth speed forward in the same manner described above.

Downshifting from fourth to first speed forward is done by reversing the sequence of operations explained above. As downshifting is accomplished, "shift shock" is again avoided by the combined action of the hydraulic pump 32 and the accumulator 45. Acceleration of the free power turbine as required during downshifting is derived in part from the energy returned to the turbine by the accumulator and hydraulic pump, acting as a motor, but is derived more significantly from the power of the gas turbine engine.

Steering in all speeds forward is accomplished by the variable displacement hydraulic motor 31 which drives sun gears 20 and 24 of combining planetary gear systems 16 and 17, respectively, in opposite directions. The effect is to add speed to one track of the vehicle while subtracting speed from the other. Since the torque of one sun gear is opposed by the torque of the other sun gear, very little torque is normally required for the variable displacement hydraulic motor to accomplish steering. High torques are required only when the tractive effort required on one track is substantially different or opposite in direction from the other, as in side hill operation, low speed operation, and pivot steering.

As explained with reference to FIG. 2, operation of the variable displacement motor is controlled by spool valve 54, the displacement of the motor being responsive to the position of the steering wheel selected by the operator of the vehicle. As the variable displacement hydraulic motor is driven by the fluid supplied under pressure by hydraulic pump 32 and accumulator 45, a slight but insignificant drop in average vehicle speed will occur.

Since steering is independent of the speed or torque of the gas turbine engine, depending entirely on input from the vehicle's operator, the radius of steer will be unaffected during upshifting and downshifting. This is an important advantage over prior art systems where steering is affected directly by engine speed causing the radius of turn to change as transmission speed ratios are changed.

Directional control 39 has a position where the vehicle's operator may elect pivot steering. When the control is put in that position, planetary gear system 5 is held stationary by the engagement of both clutches 65 and 67 and brake 69 simultaneously. Under such conditions, hydraulic pump 32 is driven directly by the free power turbine. Selection of pivot steering also sets the variable displacement hydraulic motor at maximum displacement, either left or right, depending on the position of the steering wheel. As long as the gas turbine engine is idling, no pivot steering occurs since relief valve 41 short-circuits the variable displacement motor 31 and the hydraulic pump 32; however, as fuel to the gas turbine engine is increased, the setting of the relief valve is shifted and the pressure of the fluid supplied by the hydraulic pump to the variable displacement motor is increased so that pivot steering is effected.

Movement of the vehicle in reverse is accomplished in essentially the same manner as movement ahead through engagement of clutch 67 and either brake 86 or 74 as described above.

Although vehicle brakes 89 are provided in association with planet carriers 19 and 23 to arrest the motion of the vehicle, dynamic braking can be used very effectively for the purpose by transferring energy through the transmission system to the free power turbine and to the gas producer via the overrunning clutch 8. Since accelerating the gas producer and maintaining it at high speed requires a great deal of power, the dynamic braking is substantial.

Should it be necessary, the gas turbine engine can be started by towing the vehicle. This can be accomplished by overriding the control system and placing the transmission is its high speed forward position while the vehicle is being towed. As the free power turbine rotates, overrunning clutch 88 engages the gas producer and produces rotation sufficient to start the engine.

According to the above description, the following invention is claimed as novel and is desired to be secured by Letters Patent of the United States.

I claim:

1. An integrated power system for transmitting power from a gas turbine engine, including a gas producer and a free turbine engine, to the driving elements of a vehicle comprising:
   a pair of independent output shafts;
   a pair of combining planetary gear systems, each being drivingly coupled to an associated one of said output shafts;
   a variable speed transmission drivingly coupled to said free power turbine;
   drive means operatively connecting said transmission and each of said combining planetary gear systems;
   steering means operatively coupled to each of said combining planetary gear systems for selectively driving at least one of said combining planetary gear systems;
   said steering means including a variable displacement hydraulic motor in driving engagement with said planetary gear systems and an hydraulic pump in driving engagement with said transmission for supplying fluid under pressure to said hydraulic motor to thereby effect steering of the vehicle;
   a fuel control for controlling the power output of the gas turbine engine; and
   an adjustable relief valve operatively interposed between said hydraulic motor and said hydraulic pump, said valve being responsive to said fuel control to establish a maximum fluid pressure imparted by said hydraulic pump to said hydraulic motor.

2. An integrated power system as described in claim 1 further comprising:
   an overrunning clutch for interconnecting the free power turbine to the gas producer whenever the rotational speed of the free power turbine tries to exceed that of the gas producer.

3. An integrated power system as described in claim 2 further comprising:
   an accumulator in fluid communication with said pump for exchanging energy with said hydraulic pump, energy being
   transferred between said hydraulic pump and said accumulator to decelerate the free power turbine and to accelerate it into driving engagement with the gas producer via said transmission and said overrunning clutch when the speed ratio of said transmission is changed, thereby reducing the shock associated with changing the speed ratio of said transmission.

4. An integrated power system as described in claim 1
   wherein said hydraulic motor is movable between first and second extreme positions which are oppositely disposed, respectively, from a central, stalled, position; and
   wherein said steering means includes:
   a manually operated member to effect steering of the vehicle;
   sensor means responsive to the speed and direction of rotation of said hydraulic motor to generate a signal proportional thereto;
   an actuator for controlling the direction of movement of said hydraulic motor; and
   an electronic bridge interposed between said manually operated member and said actuator for operating said actuator to control said hydraulic motor in response to movement of said manually operated member, said electronic bridge operable for comparing the position of said manually operated member with the signal from said sensor means to reduce the displacement of said variable displacement hydraulic motor as said bridge is balanced.

5. An integrated power system as described in claim 1 further comprising:
   control means responsive to the speed of the free power turbine for controlling the ratio of the output speed of said transmission relative to the speed of the free power turbine.

6. An integrated power system as described in claim 4
   wherein said actuator is movable between a first extreme position when said hydraulic motor is in its first extreme position and a second extreme position when said hydraulic motor is in its second extreme position; and
   wherein said steering means includes:
   means operatively connected to said fuel control and responsive to the first and second extreme positions, respectively, of said actuator for increasing the setting of said fuel control to increase the power output of the gas turbine engine as needed to steer the vehicle.

7. An integrated power system as described in claim 1 further comprising:
   a directional control operatively associated with said transmission for selectively establishing the direction of movement of the vehicle in the forward direction, in reverse, or for pivot steering.

8. An integrated power system as described in claim 7 further comprising:
   control means responsive to the speed of the free power turbine for controlling the ratio of the output speed of said transmission relative to the speed of the free power turbine.

* * * * *